United States Patent [19]

Al-Samadi et al.

[11] Patent Number: 5,082,645
[45] Date of Patent: Jan. 21, 1992

[54] WASTE ACID RECOVERY PROCESS

[75] Inventors: Riad A. Al-Samadi, Burlington; Cheung K. Li Kwok Cheong, Cornwall, both of Canada

[73] Assignee: Chemetics International Company, Ltd., Ontario, Canada

[21] Appl. No.: 571,786

[22] Filed: Aug. 24, 1990

[51] Int. Cl.$^5$ .................. C01B 17/50; C01B 17/74; C01B 17/90

[52] U.S. Cl. .................. 423/531; 423/403; 423/404; 423/533; 423/535; 423/540; 423/541 A

[58] Field of Search .......... 423/540, 541 A, 533, 423/535, 352, 351, 403, 404, 531

[56] References Cited

U.S. PATENT DOCUMENTS

| | | | |
|---|---|---|---|
| 2,927,001 | 3/1960 | McCullough | 423/532 |
| 3,275,407 | 9/1966 | Furkert et al. | 423/540 |
| 3,645,683 | 2/1972 | Isbell, Jr. | 423/541 A |
| 3,914,390 | 10/1975 | Kudo et al. | 423/ |
| 4,124,695 | 11/1978 | Whelan | 423/535 |
| 4,153,628 | 5/1979 | Gerken et al. | 423/540 |
| 4,208,390 | 6/1980 | Hirabayashi et al. | 423/541 A |
| 4,376,107 | 8/1983 | Morgenthaler | 423/ |
| 4,539,309 | 9/1985 | Meissner et al. | 423/535 |
| 4,770,864 | 9/1988 | Fujimoto et al. | 423/351 |
| 4,781,902 | 1/1988 | Schoubye | 423/ |

FOREIGN PATENT DOCUMENTS 0125142 11/1984 European Pat. Off. .

Primary Examiner—Wayne A. Langel
Attorney, Agent, or Firm—Cushman, Darby & Cushman

[57] ABSTRACT

A process for the recovery of sulphuric acid from a waste acid stream containing ammonium sulphate comprising vaporizing the waste acid and subsequently converting the ammonia and sulphur dioxide generated to nitrogen and sulphur trioxide, respectively. The process provides an economic method for the regeneration of the waste sulphuric acid from a methyl methacrylate production process.

9 Claims, 1 Drawing Sheet

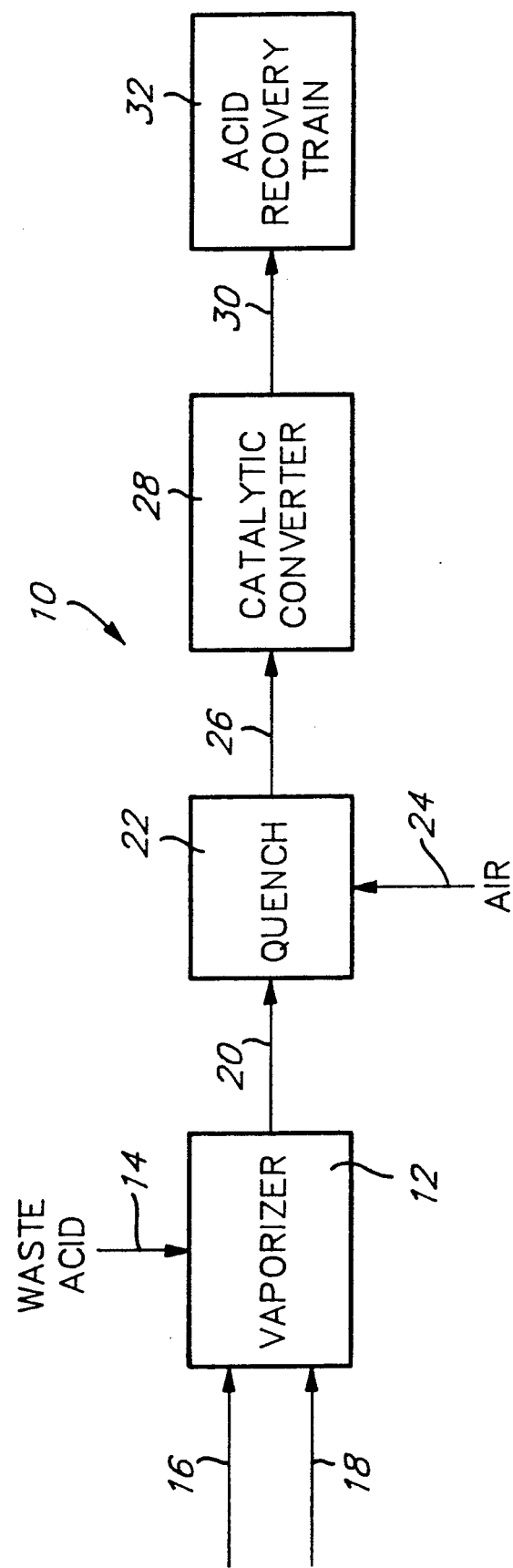

WASTE ACID RECOVERY PROCESS

FIELD OF THE INVENTION

The present invention is directed to the generation of sulphur trioxide from a waste sulphuric acid stream, which stream contains ammonium sulphate, and in particular from a waste acid stream generated in the production of methyl methacrylate (MMA).

DESCRIPTION OF THE RELATED ART

Waste sulphuric acid containing approximately 35% w/w sulphuric acid, 25% ammonium sulphate and 7% organic contaminants in water, is formed as a by-product in the cyanohydrin process for the manufacture of methyl methacrylate. The waste acid cannot be used as collected, and therefore must be disposed of or reprocessed. In the past, waste acid has been disposed of by discharging the acid into the sea. In recent years, environmental legislation has been introduced, aimed at eliminating the discharge of this acid in order to eliminate the environmental damage associated with the acid discharge.

Further, the discharge of this acid results in the loss of the valuable sulphur values present in both the sulphuric acid and the ammonium sulphate.

A known reprocessing process exists in which the waste acid is decomposed in a brick-lined combustion furnace. The temperature in the furnace is sufficiently high (e.g. greater than 1000° C.) to oxidize the organic contaminants to carbon dioxide, while at the same time decomposing the ammonium sulphate to gaseous products such as sulphur dioxide, nitrogen, and nitrogen oxides). At these temperatures, the sulphuric acid molecule decomposes rapidly to sulphur dioxide and oxygen. After cooling, cleaning and drying of the resultant gas stream, the sulphur dioxide is oxidized back to sulphur trioxide in a vanadium pentoxide containing catalyst converter bed. The sulphur trioxide thus formed is typically subsequently absorbed in a sulphuric acid absorption "train" in order to generate concentrated sulphuric acid.

This acid regeneration process tends to be capital intensive, and has high energy consumption because of the high temperatures required. Further, the reprocessing plant must be sized so as to convert all of the sulphur content of the waste acid to sulphur trioxide, since virtually all of the sulphur content of the acid stream exits the furnace as sulphur dioxide.

Morgenthaler, in U.S. Pat. No. 4,376,107 describes a process for the regeneration of a spent acid stream that is contaminated with organic compounds. The liquid spent acid stream is vaporized by, for example, atomizing, at temperatures below 1000° C. and typically between 500 and 800° C., in order to dissociate the sulphuric acid into water and sulphur trioxide, and to oxidize the organic compounds present. The sulphur trioxide can then be absorbed in sulphuric acid absorption equipment known to one skilled in the sulphuric acid manufacturing art.

However, operation of the process as described by Morgenthaler on a waste acid stream that additionally comprises ammonium sulphate results in the formation of a gas stream which contains ammonia, sulphur trioxide and sulphur dioxide. On cooling, the ammonia present reacts with the sulphur trioxide to form an ammonium sulphate powder. This ammonium sulphate powder formed will clog any downstream process equipment, such as for example, heat exchangers, and must be removed from the process. This removal of ammonium sulphate causes the loss of sulphur values from the system.

Schoubye, in U.S. Pat. No. 4,781,902 describes a process for the removal of nitrogen oxides and sulphur oxides from flue gas. The flue gas is treated in two stages. In the first stage, an excess amount of ammonia is added to the dilute flue gas stream in order to convert the nitrogen oxide compounds to nitrogen and water over a suitable reduction catalyst. In the second stage, the resultant gas stream is contacted with an oxidation catalyst to simultaneously convert the excess ammonia to nitrogen and water, and to convert the sulphur dioxide present to sulphur trioxide. The sulphur trioxide is then collected as sulphuric acid. However, Schoubye requires the use of two catalyst beds, and is silent as to a treatment process for a liquid waste acid stream which stream comprises ammonium sulphate.

The process for conversion of nitrogen oxides to nitrogen in flue gas in the presence of ammonia and sulphur dioxide has also been described in U.S. Pat. No. 3,914,390 (Kudo et al.). However, Kudo et al. is also silent as to the effect of ammonium sulphate and the recovery of a sulphur trioxide gas by regeneration of a liquid waste acid stream.

SUMMARY OF THE INVENTION

It has now been found that a waste acid stream comprising ammonium sulphate can be reprocessed to generate an ammonia and ammonium sulphate-free, sulphur trioxide containing gas stream by vaporizing the acid stream, and feeding the resultant hot gas stream to an oxidation catalyst. The sulphur trioxide generated can than be absorbed into sulphuric acid in order to generate an enriched sulphuric acid stream.

It is an object of the present invention to provide a process for the generation of sulphur trioxide from a waste acid stream, which waste acid stream comprises ammonium sulphate.

It is a further object of the present invention to provide a process for the generation of sulphuric acid from a waste sulphuric acid stream, which waste acid stream comprises ammonium sulphate.

It is a still further object of the present invention to provide a process for the generation of sulphur trioxide, or preferably sulphuric acid, from a waste acid stream, which waste acid stream comprises ammonium sulphate, and oxidizable organic compounds.

Accordingly, the present invention provides a process for the generation of sulphur trioxide from a waste acid stream comprising sulphuric acid and sulphated ammonium compounds, said process comprising:

a) vaporizing said waste acid stream at a temperature sufficient to generate a sulphate-free gas stream comprising sulphur trioxide, sulphur dioxide and ammonia gases; and b) feeding said gas stream to catalytic conversion means to effect conversion of said sulphur dioxide to sulphur trioxide, and conversion of said ammonia to other nitrogen containing gases, to provide a converter exit gas comprising sulphur trioxide essentially free of sulphur dioxide and ammonia.

Sulphate-free is to be interpreted as meaning that the waste acid stream has been vaporized at a temperature sufficient to cause substantially complete dissociation of the sulphated ammonium compounds to ammonia, and sulphur trioxide and/or sulphur dioxide.

The term essentially free of sulphur dioxide and ammonia is to be interpreted as meaning that the concentration of each of these two gases in the gas exiting the catalytic conversion means has been lowered to an individual value which is generally less than 10%, and preferably less than 1%, of its initial concentration after the waste acid stream has been vaporized.

The waste acid stream is preferably vaporized in a vaporizer wherein a liquid stream of acid is sprayed into a hot gas stream in a suitable vessel. However, it is also possible to effect vaporization by any suitable means, such as for example, contacting the waste acid stream with a hot air or combustion gases in a contact tower or vessel.

Preferably, the waste acid stream is vaporized at a temperature selected from the range of 400 to 650° C.

The waste acid stream is preferably comprised of 3 to 8% by weight of ammonia as sulphated ammonium compounds and 20 to 50% by weight of sulphuric acid. The sulphated ammonium compounds are typically ammonium sulphate and/or ammonium bisulphate.

The process of the present invention may also be used when the liquid waste acid comprises waste organic compounds. Preferably, the organic compounds are oxidizable to carbon dioxide, at the temperatures used to vaporize the liquid waste acid stream, in order to effect destruction of the organic compounds. Accordingly, the present invention provides a process as hereinabove defined wherein said waste acid stream additionally comprises oxidizable organic compounds.

Preferably, the waste acid stream comprises 3 to 15% by weight of said organic compounds.

The gas exiting the vaporizer is fed to the converter means, which means is preferably one or a series of vanadium pentoxide catalyst containing converter beds known within the sulphuric acid manufacturing industry, without allowing the gases to cool to less than about 400° C. If allowed to cool, the ammonia which remains in the gas stream and the sulphur trioxide present will form particulate ammonium sulphate, which will contaminate the catalyst bed, or block passageways in heat exchangers or pumps.

The waste acid is vaporized at a temperature of at least about 400° C., and more preferably at a temperature of at least about 450° C., in order to ensure effective vaporization, and to ensure decomposition of the ammonium sulphate. While high temperatures may be utilized, it is preferable to maintain the vaporization temperature below 650° C., and more preferably below 550° C. in order to avoid production of various nitrogen oxides ($NO_x$) in the exit gases generated by the present process.

Preferably, the waste acid stream is vaporized at 450 to 550° C., and the resultant gas stream is fed to the catalytic conversion means in the same temperature range.

The sulphur trioxide present in the essentially sulphur dioxide and ammonia free gas stream may be collected as sulphuric acid in a fashion known to one skilled in the sulphuric acid manufacturing art. For example, the sulphur trioxide can be absorbed in a water/sulphuric acid mixture in a typical sulphur trioxide absorption means, such as absorption towers or partial condensation 'trains', known within the industry. In this manner, acids of varying strengths can be produced including typical commercial grades of sulphuric acid of greater than 93% acid.

Accordingly, in a further aspect the present invention also provides a process for the production of enriched sulphuric acid, or more generally, sulphuric acid of increased concentration, according to the present invention as described hereinabove, which process additionally comprises feeding said converter exit gas to sulphur trioxide absorption means wherein said sulphur trioxide is absorbed into sulphuric acid.

This aspect of the present invention allows for the production of a sulphuric acid stream which can be, for example, recycled back to the original process.

The processes defined hereinabove are suitable for the generation of sulphur trioxide from any ammonium sulphate containing waste sulphuric acid stream, such as the acid stream generated in the production of caprolactam, or the acid stream collected from during the scrubbing of ammonia from coke oven gases, but is particularly well suited for the generation of sulphur trioxide from the waste acid stream from a methyl methacrylate production process.

BRIEF DESCRIPTION OF THE DRAWING

The preferred apparatus of use in the practice of the present invention will now be described with reference to the attached Figure which is a schematic drawing of a preferred apparatus for the generation of a regenerated sulphuric acid stream.

In the Figure, an apparatus 10 of use in the present invention is shown comprising a waste acid vaporizer 12 having a waste acid inlet 14, air inlet 16, fuel inlet 18, and gaseous outlet 20. Gaseous outlet 20 is also connected to air quench chamber 22 which chamber has a second air inlet 24 and gaseous outlet 26. Gaseous outlet 26 is connected to a catalytic converter bed 28 which bed 28 also has a gaseous outlet 30. Gaseous outlet 30 is attached to sulphuric acid recovery train 32.

Waste acid is fed into vaporizer 12 via waste acid inlet 14 wherein the acid is mixed in a hot gas mixture generated by burning fuel, fed to vaporizer 12 via fuel inlet 18, in air fed to the vaporizer via first air inlet 16. Air is also fed to quench chamber 22 via second air inlet 24.

In operation, an ammonium sulphate-containing waste sulphuric acid stream is fed to vaporizer 12 through waste acid inlet 14. The waste acid is sprayed as an atomized stream into the hot gases in vaporizer 12 which hot gases have been produced by burning fuel fed through fuel inlet 18 with air fed through first air inlet 16. The resultant gases generated leave vaporizer 12 via gaseous outlet 20 and are fed to air quench chamber 22. The gases exiting the vaporizer have a temperature of 450° C., and are cooled in air quench chamber 22 by the addition of a cooler air stream fed through second air inlet 24, to a temperature of 410° C.

An additional advantage of the air quench, other than the cooling effect, is that additional oxygen is added to the vaporizer exit gases in order to ensure that there is sufficient oxygen present in the vaporizer exit gas to effect conversion of sulphur dioxide to sulphur trioxide.

The gases exiting vaporizer 12 comprise ammonia, nitrogen, sulphur trioxide, sulphur dioxide and water vapour, and are fed to catalytic converter 28 from air quench chamber 22 via gaseous outlet 26. Catalytic converter 28 comprises a vanadium pentoxide catalyst which catalyzes the conversion of sulphur dioxide and ammonia to sulphur trioxide and nitrogen containing gases (with a minimal amount of $NO_x$ gases) respectively. The gases exiting catalytic converter 28 are fed to acid recovery train 32 via gaseous outlet 30 wherein the sulphur trioxide present in the catalyst bed exit gases is collected in a sulphuric acid stream in order to generate an enriched sulphuric acid stream.

EXAMPLES

The present invention will now be further described by reference to the following examples In the examples, a laboratory scale apparatus similar in nature to the apparatus described in the Figure was used with a contact reactor used in place of the spray tower. The reactor was fabricated from a glass column which was packed with ceramic saddles. Waste acid was fed into the top of the reactor at a flow rate of 0.1 g/min. In Example 12, the flow rate of acid addition was increased to 0.5 g/min. A concurrent flow of heated air was fed into the reactor along with the feed acid. In Examples 7 to 12, conducted according to the present invention, an additional zone of a vanadium pentoxide catalyst was placed at the bottom of the column, so that the vaporized gases pass through the catalyst before exiting the column.

The gases exiting the bottom of the column were passed through a condenser to effect condensation of sulphur trioxide and water to generate a sulphuric acid product which was collected and analyzed. The non-condensed gases were passed through sodium hydroxide and hydrochloric acid scrubbers, in order to collect any residual sulphur trioxide, sulphur dioxide, ammonia, or organic compounds.

Each run was conducted over 4 to 12 hours, and at various temperatures. The feed acid and the products collected were analyzed according to the following procedures:

total acidity (TA) was measured by back titration with NaOH to a methyl-red endpoint;

total organic carbon (TOC) was measured by pyrolysis;

the ammonium ($NH_4^+$) level was determined using Nessler's reagent and a colourimetric technique;

the scrubber solutions were analyzed by ion chromatography for $SO_3^{2-}$, $SO_4^{2-}$, and by a potentiometric techniques for $NO_2^-$ and $NO_3^-$; and the ammonium level in the HCl scrubber solution was determined using an ion selective electrode.

The results of the various runs are shown in the Table.

The feed acid for Examples 1 and 2 was synthetically prepared by mixing the appropriate amounts of sulphuric acid and ammonium sulphate. Feed acid for the remainder of the examples was an actual aqueous sample of MMA waste acid which MMA waste acid was approximately 35% sulphuric acid, and 25% ammonium sulphate, with a total organic carbon (TOC) content of about 2%.

Examples 1 to 6 were conducted without a catalyst, and thus are not in accordance with the present invention. All of Examples 1 to 6 show significant conversion of sulphur trioxide to sulphur dioxide. Conversion levels of at least 25.8% are observed. This conversion is undesirable because in order to collect sulphuric acid, the sulphur dioxide must be converted back to the trioxide, prior to absorption. This high conversion level is indicated by the low total acidity (TA) of the product acid.

In all of Examples 1 to 6, the formation of powdered ammonium sulphate was observed. In some cases, the formation of the ammonium sulphate plugged the feed line to the sulphuric acid collection vessel within as little as 3 to 4 hours.

This production of ammonium sulphate would severely restrict the practical use of this process in a commercial application since, as described hereinabove, the powdered solid would have to be removed to avoid clogging downstream equipment.

Further, the product acid produced in Examples 1 to 6 have undesirably high levels of ammonium and, in Examples 3 to 6, high levels of TOC.

TABLE

| | Temp. (°C.) | Feed Acid | | | Product Acid | | | Overall $NH_4$ Convers. (%) | $NH_4$ Conversion to $NO_x$ (%) | $SO_3$ Conversion to $SO_2$ (%) | Overall Organic Convers. (%) | $(NH_4)_2SO_4$ Powder Formed |
|---|---|---|---|---|---|---|---|---|---|---|---|---|
| | | TA (%) | $NH_4$ (%) | TOC (%) | TA (%) | $NH_4$ (ppm) | TOC (ppm) | | | | | |
| Without Catalyst | | | | | | | | | | | | |
| Example 1 | 600 | 36.6 | 6.1 | 0.0 | 8.5 | 6000 | 0 | 85.7 | 0.9 | 77.7 | — | Yes |
| 2 | 600 | 36.2 | 3.2 | 0.0 | 1.4 | 19000 | 0 | 78.7 | 0.0 | 30.2 | — | Yes |
| 3 | 400 | 36.2 | 5.6 | 1.9 | 2.3 | 22000 | 5200 | 82.4 | 0.0 | 25.8 | 94.2 | Yes |
| 4 | 600 | 46.2 | 4.9 | 1.7 | 9.9 | 12000 | 490 | 60.9 | 0.04 | 43.1 | 98.6 | Yes |
| 5 | 600 | 36.2 | 7.24 | 1.98 | 0.2 | 20800 | 142 | 73.7 | 0.0 | 38.3 | 99.5 | Yes |
| 6 | 550 | 36.2 | 7.22 | 1.91 | 1.9 | 27800 | 302 | 59.5 | 0.0 | 73.8 | 99.3 | Yes |
| With Catalyst | | | | | | | | | | | | |
| Example 7 | 600 | 36.2 | 6.94 | 1.95 | 52.7 | 700 | 23 | 99.1 | 16.8 | 0.0 | 99.9 | No |
| 8 | 550 | 36.2 | 7.26 | 1.96 | 55.5 | 16 | 17 | 99.9 | 21.9 | 0.0 | 99.9 | No |
| 9 | 500 | 36.2 | 7.11 | 1.94 | 53.6 | 4.1 | 14 | 99.9 | 9.6 | 0.0 | 99.9 | No |
| 10 | 450 | 36.2 | 7.07 | 1.91 | 51.6 | 5.0 | 41 | 99.9 | 3.3 | 0.0 | 99.9 | No |
| 11 | 400 | 36.1 | 7.11 | 1.91 | 47.3 | 52.9 | 151 | 99.9 | 0.3 | 0.0 | 99.9 | No |
| 12 | 550 | 36.2 | 6.6 | 1.93 | 50.7 | 5.0 | 38 | 99.9 | 1.3 | 0.0 | 99.9 | No |

This is indicated in the low level of overall ammonium conversion, and the incomplete overall organic conversion percentages. The low levels of ammonium to $NO_x$ also indicate the low levels of ammonium conversion to other products.

Examples 7 to 12, which were conducted using a vanadium pentoxide catalyst and thus are in accordance with the present invention, had no formation of ammonium sulphate observed in the process equipment. The lack of powdered ammonium sulphate formation in the process equipment greatly improves the operational feasibility of the present waste acid recovery process.

The product acid for Examples 7 to 12 have high total acidities, low ammonium levels, and low TOC. This is indicated respectively by the low sulphur trioxide to sulphur dioxide conversion level, the high ammonium conversion level, and the almost complete overall organic conversion level.

The production of $NO_x$ in Examples 7 to 12 further indicates that the ammonium ion is undergoing conversion to other products in the process.

In Examples 7 to 12, it can be seen that the production of $NO_x$ is dependent on the temperature at which the feed acid is vaporized. As the temperature decreases from 600° C. to 400° C. the conversion of ammonia to NOx decreases from 16.8-21.9% to 0.3%.

The product acid collected in these examples is less concentrated than commercial grades of acid. However, one skilled in the sulphuric acid art would readily appreciate that higher acid concentrations could be achieved by absorption of the vaporized sulphur trioxide containing gases in a typical absorption means, such as an absorption tower or a partial condensation train.

The embodiments of the invention in which an exclusive property or privilege is claimed are defined as follows:

1. A process for the generation of sulphur trioxide from a waste acid stream comprising sulphuric acid and sulphated ammonium compounds, said process comprising:
    a) vaporizing said waste acid stream at a temperature sufficient to generate a sulphate-free gas stream comprising sulphur trioxide, sulphur dioxide and ammonia gases; and
    b) feeding said gas stream to catalytic conversion means to effect conversion of said sulphur dioxide to sulphur trioxide, and conversion of said ammonia to other nitrogen containing gases, to provide a converter exit gas comprising sulphur trioxide essentially free of sulphur dioxide and ammonia.

2. A process as claimed in claim 1 wherein said waste acid stream additionally comprises oxidizable organic compounds.

3. A process as claimed in claim 1 wherein said catalytic conversion means is a vanadium pentoxide catalyst.

4. A process as claimed in claim 1 wherein said waste acid stream is vaporized at a temperature selected from the range of 400 to 650° C.

5. A process as claimed in claim 4 wherein said waste acid stream is vaporized at 450 to 550° C.

6. A process as claimed in claim 1 wherein said sulphated ammonium compounds are ammonium sulphate and/or ammonium bisulphate.

7. A process as claimed in claim 1 wherein said waste acid stream comprises 3 to 8% by weight of ammonia as sulphated ammonium compounds and 20 to 50% by weight of sulphuric acid.

8. A process as claimed in claim 2 wherein said waste acid stream comprises 3 to 15% by weight of said organic compounds.

9. A process for the production of enriched sulphuric acid comprising the process as claimed in claim 1 or 2 and additionally comprising:
    c) feeding said converter exit gas to sulphur trioxide absorption means wherein said sulphur trioxide is absorbed into sulphuric acid.

* * * * *